455/4

United States Patent [19]

Harney

[11] 3,882,392

[45] May 6, 1975

[54] HOTEL-MOTEL PAY TV SYSTEM

[75] Inventor: Ralph P. Harney, Wonder Lake, Ill.

[73] Assignee: Oak Industries, Inc., Crystal Lake, Ill.

[22] Filed: Jan. 29, 1973

[21] Appl. No.: 327,582

[52] U.S. Cl. ............................ 325/53; 178/DIG. 13

[51] Int. Cl. ............................................ H04k 1/00

[58] Field of Search ........... 325/31, 53, 54, 64, 308, 325/309, 394; 178/DIG. 13, DIG. 9, DIG. 15; 179/1 B; 340/150, 151, 310 R

[56] References Cited

UNITED STATES PATENTS

| | | | |
|---|---|---|---|
| 3,355,546 | 11/1967 | King | 325/308 |
| 3,396,232 | 8/1968 | Hendrickson et al. | 325/31 |
| 3,423,521 | 1/1969 | Friesen et al. | 325/309 |
| 3,492,577 | 1/1970 | Reiter et al. | 325/31 |
| 3,586,771 | 6/1971 | Hamburger et al. | 325/308 |
| 3,716,654 | 2/1973 | Hendrickson et al. | 325/31 |
| 3,790,700 | 2/1974 | Callais | 325/309 |
| 3,796,829 | 3/1974 | Gray | 178/DIG. 13 |

*Primary Examiner*—Richard Murray
*Assistant Examiner*—George H. Libman
*Attorney, Agent, or Firm*—Kinzer, Plyer, Dorn & McEachran

[57] ABSTRACT

A subscription TV system includes a central station, various TV receivers and cable connections between the central station and receivers. There are means at each receiver for decoding TV signals received from the central station. Also at each receiver is a means for placing the decoder in operation in response to authorization signals from the central station. The clock which coordinates the central station and receiver authorization signal transmitting and receiving means uses local power line frequency as a base.

7 Claims, 3 Drawing Figures

HOTEL-MOTEL PAY TV SYSTEM

SUMMARY OF THE INVENTION

The present invention relates to a subscription TV system and in particular to such a system which uses power line frequency as a basis for the clock signals coordinating the sending and receiving of authorization signals.

Another purpose of the invention is a simply constructed reliably operable subscription TV system.

Another purpose is a subscription TV system of the type described in which the central station and each receiver location includes counting means, the operation of which is instituted by a counter start signal generator located at the central station.

Another purpose is a subscription pay TV system particularly suitable for motel or hotel application.

Another purpose is a subscription TV system in which periodic authorization signals are necessary to maintain the individual receivers in a condition to decode received TV signals.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The subscription system described herein includes a central station which may transmit TV signals over a cable to a plurality of receivers. The invention has application particularly in the hotel-motel field in which the central station can provide both normal TV service and premium or subscription TV service. Both signals are sent out over the cable with the central station controlling reception at each individual location or room.

At each receiver location there are means to select either the normal TV signals, for example those channels customarily visible on a VHF-UHF receiver, as well as the premium signals which may be shown on locally unused channels. When a guest in a hotel or motel room desires to see premium programming, he advises the central station, preferably by phone, of his wishes. Appropriate switching action will take place at the central station to enable his receiver to receive the premium programming. Also, the guest will operate a switch at his receiver to place it in a position to receive the premium programming.

The central station will send out sequential authorization signals to those receivers which are to receive the premium programming. The authorization signals are repetitive in the sense that the decoder at each receiver location will only remain operative for a predetermined period of time unless successive authorization signals are received. In that way, the central station retains control over the premium programming.

There are counters arranged both at the central station and at each receiver, with the counters providing address means to enable each receiver to receive an authorization signal at a predetermined period after initiation of the authorization cycle by the counter start signals which emanate from the central station.

To synchronize the counter start signals and the authorization signals which are transmitted from the central station and received at each TV receiver, the clock signals are locally derived. The central station clock signal is derived from local power frequency and in like manner the clock signals at each receiver are derived from the power frequency at the local receiver. Thus, since in a hotel or motel situation, the central station and all of the receivers will operate off of the same in phase local power, the clock signals at both the central station and each receiver, which control the authorization signals, will be synchronized, with such synchronization being accomplished with a minimum of equipment and expense.

Figures 1, 2:
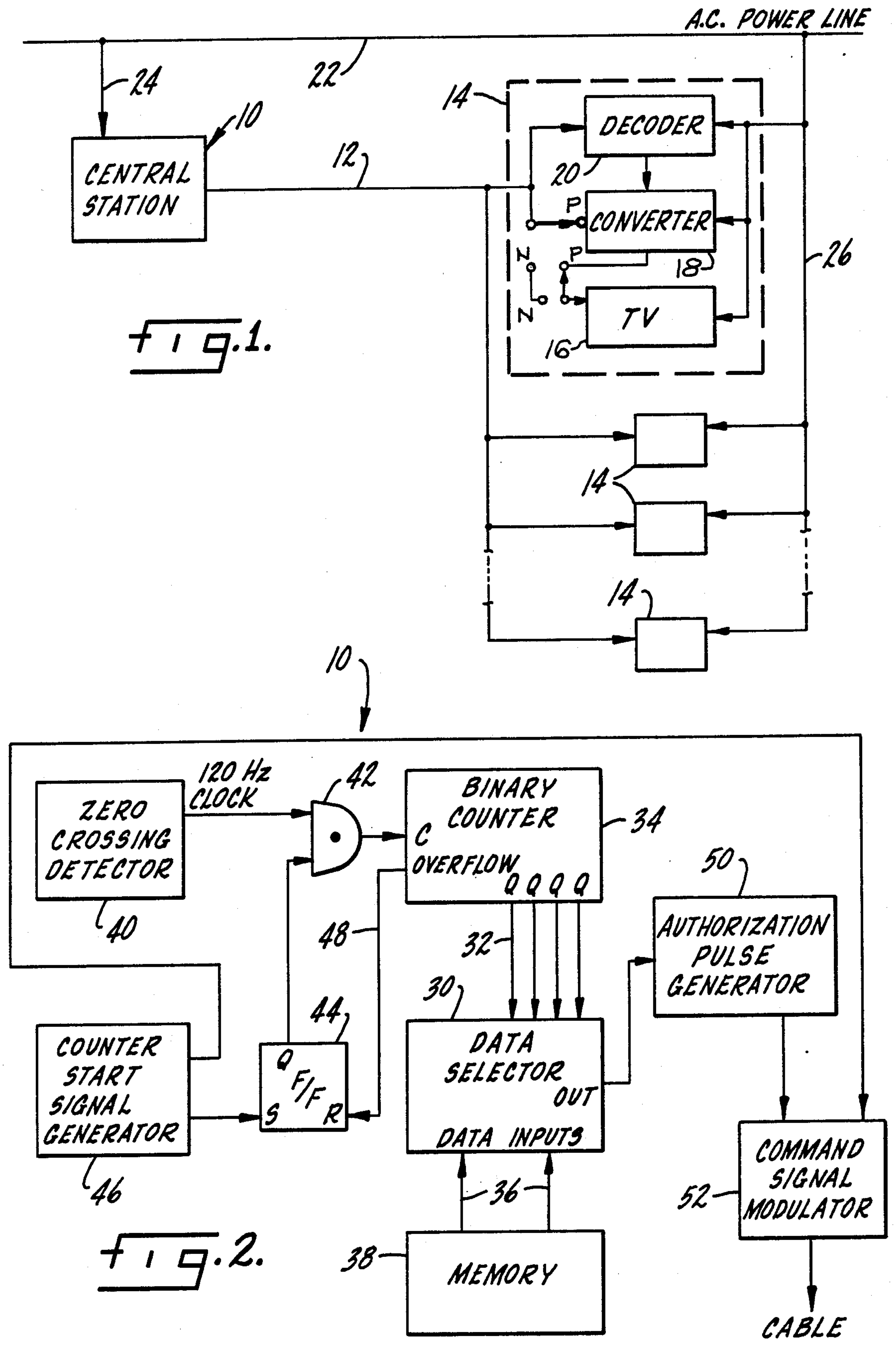
FIG. 1 is a diagrammatic illustration of a subscription TV system.
FIG. 2 is a block diagram of the central station.

In FIG. 1 a central station is indicated generally at 10 and is connected by a cable 12 to a plurality of receiver locations indicated generally at 14. Each receiver location includes a TV receiver 16, a converter 18, and a decoder 20. An AC power line is indicated at 22 and is connected to the central station 10, by a line 24, and to each of the receiver locations 14 by a line 26. Thus, as described above, there is a common power line frequency used to provide the synchronous clock signals for both the central station and all of the receiver locations.

In FIG. 2, illustrating the central station coder, a data selector is indicated at 30 and is connected by lines 32 to a binary counter 34. The data selector has inputs via lines 36 from a memory 38 which may conveniently be a bank of switches, one for each room or receiver location. Thus, when a particular receiver is to receive premium programming, a switch is placed in such a position that an address in binary form indicative of that receiver location is placed on lines 36 for input into the data selector.

A zero crossing detector 40 provides a clock signal which will be at a frequency of 120 Hz or twice the frequency of the local power signal, assuming 60 cycle power. The 120 Hz clock is directed to an AND gate 42, which also receives an input from a flip-flop 44. The flip-flop 44 receives an input from a counter start signal generator 46. Thus, the initiation of the authorization cycle begins with a signal from the counter start signal generator 46 which causes flip-flop 44 to place a signal at one input of AND gate 42 and at the next pulse from the clock signal there will be an output from AND gate 42 to the binary counter 34 to initiate operation of the counter.

There is an overflow connection from the counter back to flip-flop 44, indicated at 48, which has the effect of resetting the flip-flop at the end of the authorization cycle.

The data selector 30 compares the input from the memory 38 with the input from the binary counter. When there is correspondence between the two, indicating that the counter has reached the address of a particular receiver location, the data selector will send a trigger signal to the authorization pulse generator 50. The authorization pulse generator 50 in turn will send an authorization signal through the command signal generator 52 out onto the cable. Note that the counter start signal generator 46 also sends its signal through the command signal modulator 52. Thus, modulator 52 provides both authorization signals and counter start signals for the cable system. When frequency shift keying is the modulation means for sending the counter start and authorization signals, 109 Mhz and 111 Mhz generators will be connected to or incorporated into the modulator 52 to provide signals of this frequency on the cable system.

Figure 3:
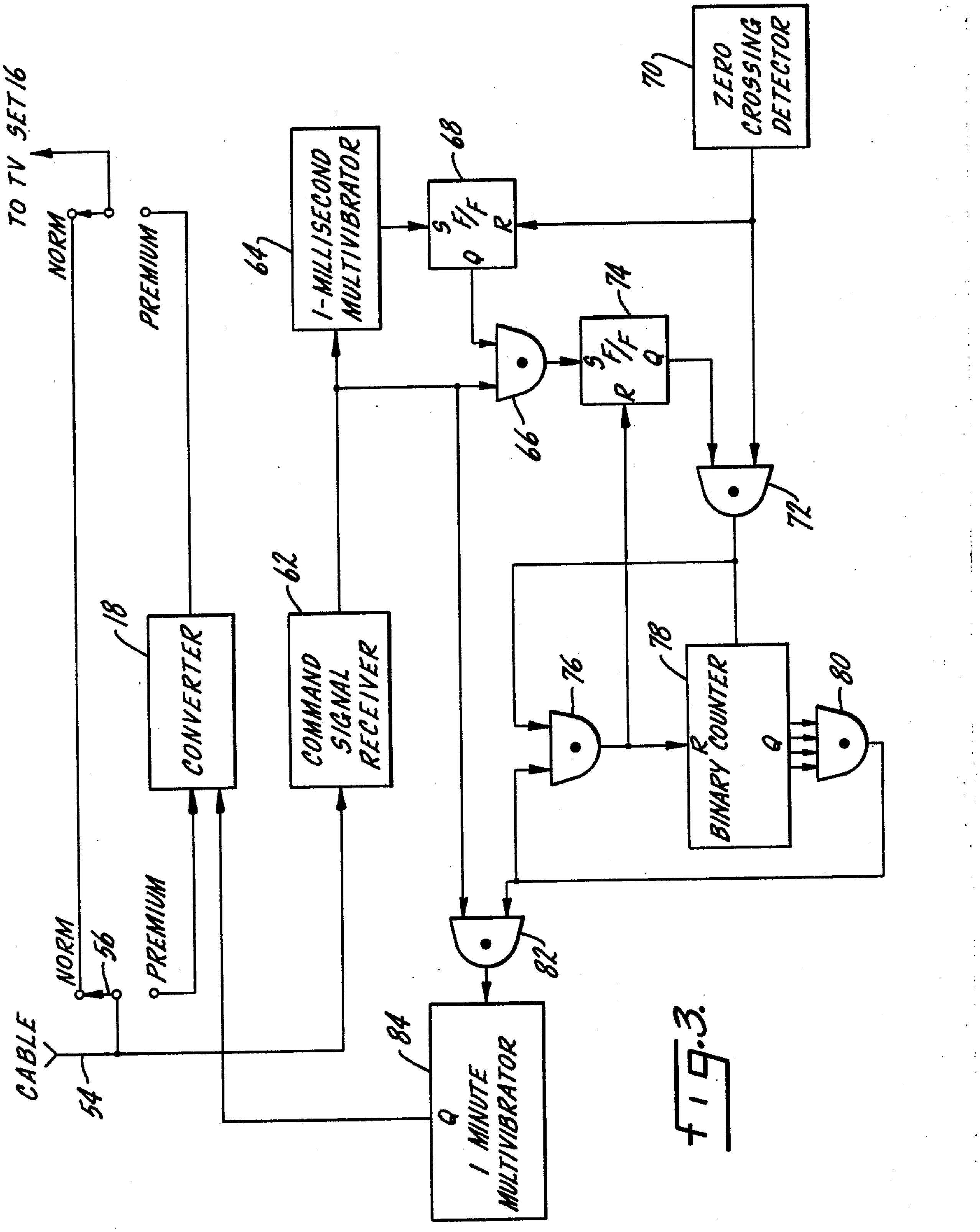
FIG. 3 is a block diagram of a typical decoder-receiver installation.

In FIG. 3 the converter-decoder has a cable input 54 connected to a switch 56 which has a normal position and a premium position. When in the normal position, the signals received over the cable, for example the conventional VHF and UHF channels, will bypass the decoder converter and be connected directed to the TV set 16. When switch 56 is in the premium position, the TV signals will be directed to converter 18. The converter 18 may be a block converter effective to convert channels A through D to channels 10-13. This is only one illustration of the type of conversion that may be used. However, it is advantageous to convert the premium TV signals to normally unused channels in the receiver.

The decoder includes a command signal receiver 62 connected to a one-shot multivibrator 64 and to an AND gate 66. A flip-flop 68 receives an input from a zero crossing detector 70 which, as described above, provides a 120 Hz clock signal. The zero crossing detector 70 also provides a clock input to AND gate 72. A flip-flop 74 is connected between AND gate 66 and AND gate 72 and also receives a reset input from AND gate 76. A binary counter is indicated at 78 and has its output connected to AND gate 80. AND gate 80 in turn has its output connected to AND gate 82 and to AND gate 76. The output of AND gate 82 is connected to a second one-shot multivibrator 84 which in turn provides a converter turn-on signal for the block channel converter 18.

In operation a counter start signal initiates the authorization cycle. Subsequently during the various clock periods controlled by the 120 Hz clock at the central station and receiver locations, there will be authorization signals, with each authorization signal being transmitted between successive clock pulses or during various clock periods. The counter start signal will be transmitted by the command signal modulator 52 to each subscriber location where the command signal generator provides an input to AND gate 66. A second input to this gate from flip-flop 68, triggered by the command signal through multivibrator 64, will cause a signal from AND gate 66 to flip-flop 74, the output 86, which, combined with the 120 Hz clock signal in AND gate 72, will start the counter 78. Thus, counter 78 will start at the same time as counter 34 at the central station which has been placed in an operable condition by the combination of the 120 Hz clock signal in AND gate 42 and a signal from flip-flop 44. The counter start signal has a duration greater than one millisecond. Thus, AND gate 66 will only provide an output to flip-flop 74 when a counter start signal is received. Authorization signals have a duration of less than one millisecond and will not cause an output from AND gate 66.

The memory 38 which, as described above, may be a bank of switches, provides a binary address for the data selector 30. When the address provided by the binary counter 34 corresponds with the address provided from memory 38, an authorization signal will be provided by pulse generator 50. The authorization signal will be within a particular counting period as controlled by the clock signals, both at the central station and at each receiver location. Thus, the transmission of an authorization signal during a particular period will correspond to a particular address provided by the counter. The counter 78 at each receiver location will be in synchronism with counter 34. The counter 78 at each receiver location is interconnected to AND gate 80 in such a fashion as to provide an output from AND gate 80 only during the clock period designated as the authorization period for that particular receiver location. AND gate 80 in turn will provide a signal to AND gate 82. An authorization signal provides the second input to AND gate 82 with the two inputs into the gate causing an output to the 1 minute multivibrator 84 which in turn places the channel converter 18 in an operable condition. For example, the output from multivibrator 84 may be effective to turn on B+ to one or more of the converter stages.

The output from AND gate 80 also is effective to cause gate 76 to turn the counter 78 off. Counter 78 counts the trailing edge of the clock pulse. The leading edge of the next following pulse is effective to place AND gate 76, when combined with the output from AND gate 80, in an on condition and thus turn the counter 78 off or to reset it.

As indicated above, the converter 18 may be a block converter which converts one or more than one cable channel at a normally unused frequency to a frequency which can be usable on the TV receiver. Such block converters are well known in the art.

AND gate 66 can only be placed in an operable condition when the counter start signal has a sufficient duration. For example, more than 1 millisecond is necessary to cause multivibrator 64 to operate and the operation of this multivibrator provides the signal from flip-flop 68 to AND gate 66 to thus initiate the authorization cycle at each of the receivers.

Multivibrator 84 will be automatically reset after a predetermined period, for example 1 minute. Thus, repetitive authorization signals are necessary to maintain converter 18 in operation. If a 10-bit binary counter is used, there may be 1023 receivers on one system. With a 120 Hz clock rate, a full authorization cycle will consume approximately 9 seconds.

The invention should not be limited to a 120 Hz clock.

Of importance is the fact that the clock signals are derived from power line frequency, thus providing synchronism between the central station and all of the receiver locations. Also, such an arrangement provides synchronized clock signals with a substantially reduced amount of equipment and consequent expense.

Whereas the preferred form of the invention has been shown and described herein, it should be realized that there may be many modifications, substitutions and alterations thereto.

The embodiments of the invention in which an exclusive property or privilege is claimed are defined as follows:

1. In a subscription TV system having a central station, a plurality of receivers and cable connections therebetween, means at the central station for sending TV signals to the receivers, means at each receiver for converting the received TV signals to signals useful in the receiver, means at the central station for repetitively and periodically transmitting authorization signals over the cable to only predetermined selected authorized receivers, and means at each receiver for enabling its converting means for only a predetermined period and in response to and upon receipt of each of its repetitive and periodic specific authorization signals, said period being longer than the time between consecutive authorization signals, and clock means at the central station and each receiver for synchronizing the sending and receiving of said authorization signals, said clock means being connected to a power line and using power line frequency as a base.

2. The subscription TV system of claim 1 further characterized in that the converting means at each receiver converts TV signals from one channel frequency to a second channel frequency.

3. The subscription TV system of claim 2 further characterized in that said conversion means converts the TV signals on the cable, from a frequency normally unusable in a TV receiver, to a frequency usable in a TV receiver.

4. The subscription TV system of claim 1 further characterized in that the means at the central station for transmitting authorization signals includes a data selector, a counter for providing address information to the data selector and control means connected to the data selector for providing an indication of which receivers should receive authorization signals, the data selector comparing the information received from the counter and that from the control means so as to send authorization signals to predetermined receivers.

5. The subscription TV system of claim 4 further characterized by and including means for generating a counter start signal, said counter start signal initiating operation of the counter.

6. The subscription TV system of claim 5 further characterized by and including a counter at each receiver, said counter start signals instituting operation of each receiver's counter.

7. The subscription TV system of claim 1 further characterized by counting means at the central station and each receiver, said clock means synchronizing the operation of said counting means.

* * * * *